United States Patent
Sasaki

(10) Patent No.: US 10,393,996 B2
(45) Date of Patent: Aug. 27, 2019

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Takashi Sasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 15/571,093

(22) PCT Filed: May 17, 2016

(86) PCT No.: PCT/JP2016/002407
§ 371 (c)(1),
(2) Date: Nov. 1, 2017

(87) PCT Pub. No.: WO2016/185713
PCT Pub. Date: Nov. 24, 2016

(65) Prior Publication Data
US 2018/0259743 A1    Sep. 13, 2018

(30) Foreign Application Priority Data
May 19, 2015   (JP) ................................ 2015-101937

(51) Int. Cl.
*H04N 5/232*   (2006.01)
*G02B 7/34*   (2006.01)
(Continued)

(52) U.S. Cl.
CPC ................ *G02B 7/34* (2013.01); *G06T 5/006* (2013.01); *G06T 5/50* (2013.01); *G06T 7/97* (2017.01);
(Continued)

(58) Field of Classification Search
CPC ...... G02B 7/34; H04N 13/128; H04N 5/2356; H04N 5/23212; H04N 2013/0081;
(Continued)

(56) References Cited

U.S. PATENT DOCUMENTS

2016/0381342 A1* 12/2016 Matsuoka .............. H04N 5/232
348/47

FOREIGN PATENT DOCUMENTS

| JP | 2010-183174 A | 8/2010 |
|----|---------------|--------|
| JP | 2012-182731 A | 9/2012 |
| JP | 2015-073185 A | 4/2015 |

OTHER PUBLICATIONS

JP 2015-073185 translation (Year: 2015).*
(Continued)

*Primary Examiner* — Twyler L Hawkins
*Assistant Examiner* — Angel L Garces-Rivera
(74) *Attorney, Agent, or Firm* — Cowan, Liebowitz & Latman, P.C.

(57) ABSTRACT

An image processing unit of an image pickup apparatus acquires a plurality of sets of image data that have different shooting times. A defocus map generating unit generates each of a plurality of defocus maps that represent a spatial distribution of a defocus amount by using two or more sets of image data. A positional deviation correction unit performs alignment of a plurality of defocus maps through the geometrical deformation processing by using a control parameter that has been acquired from a positional deviation correction control parameter calculation unit. A composing unit composes the plurality of defocus maps that have undergone alignment. A defocus map shaping unit performs the shaping processing on the defocus map after the composing processing, and outputs defocus map data that smoothly changes along the outline of an object.

18 Claims, 12 Drawing Sheets

(51) Int. Cl.
  *H04N 5/235*   (2006.01)
  *G06T 5/00*    (2006.01)
  *G06T 5/50*    (2006.01)
  *G06T 7/00*    (2017.01)
  *H04N 13/128*  (2018.01)
  *H04N 13/00*   (2018.01)
(52) U.S. Cl.
  CPC ....... *H04N 5/2356* (2013.01); *H04N 5/23212* (2013.01); *H04N 13/128* (2018.05); *G06T 2207/10012* (2013.01); *H04N 2013/0081* (2013.01)
(58) Field of Classification Search
  CPC .. G06T 7/97; G06T 5/50; G06T 5/006; G06T 2207/10012
  See application file for complete search history.

(56) References Cited

OTHER PUBLICATIONS

JP 2012-182731 translation (Year: 2012).*
The above references were cited the Search Report of International Application No. PCT/JP2016/002407 dated Aug. 9, 2016.

* cited by examiner

[Fig. 1]
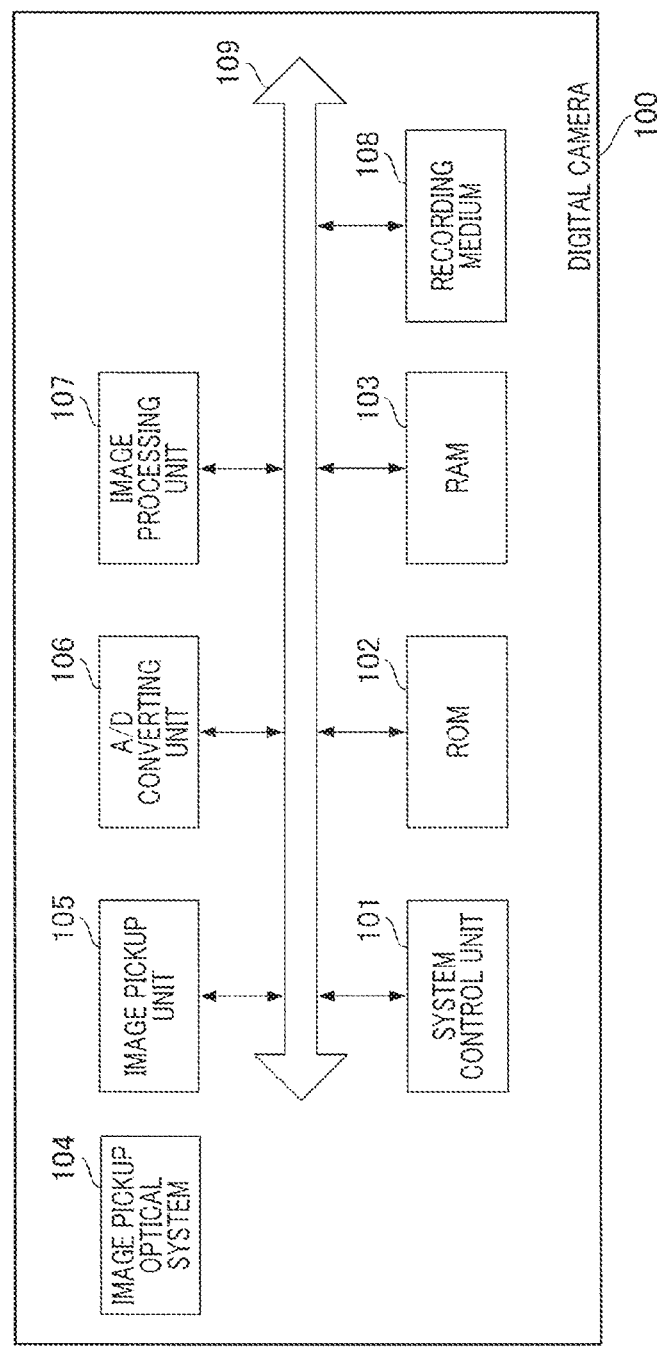

[Fig. 2A]
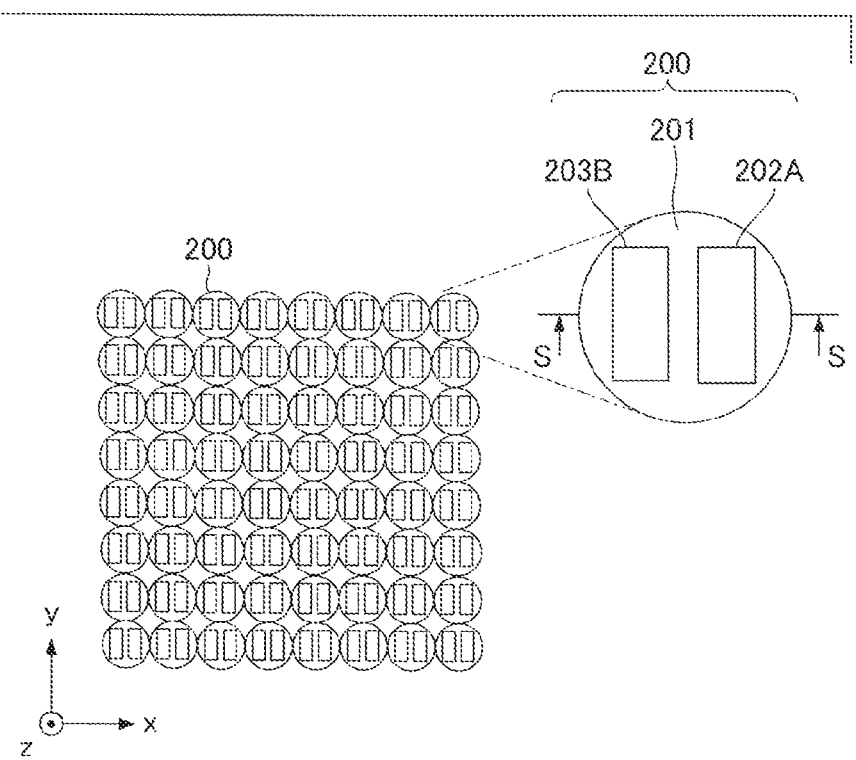

[Fig. 2B]
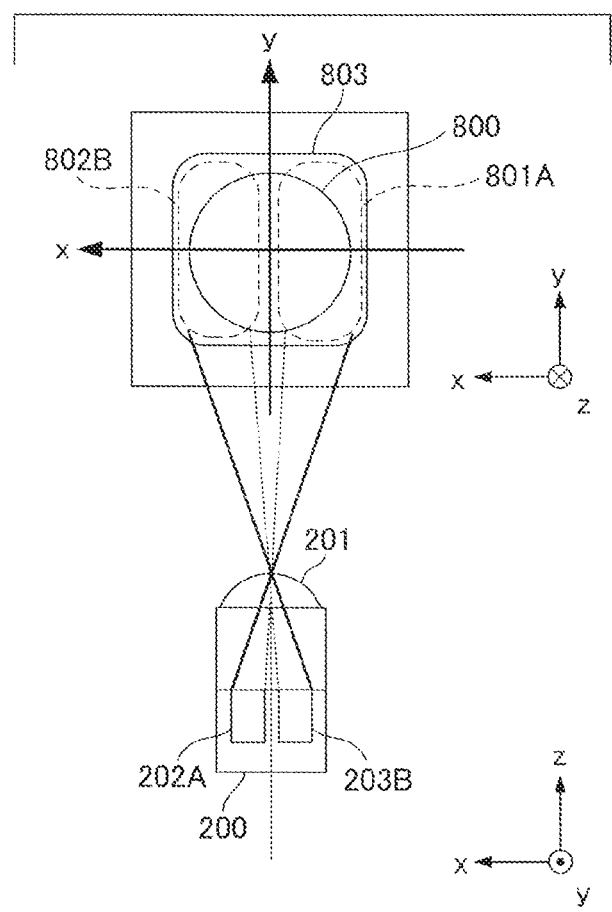

[Fig. 3]
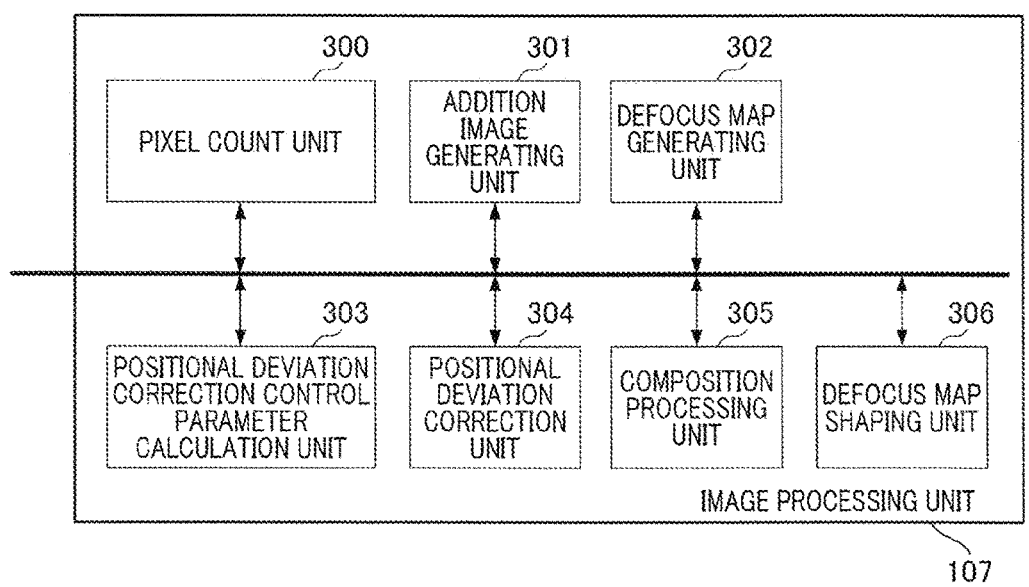

[Fig. 4]
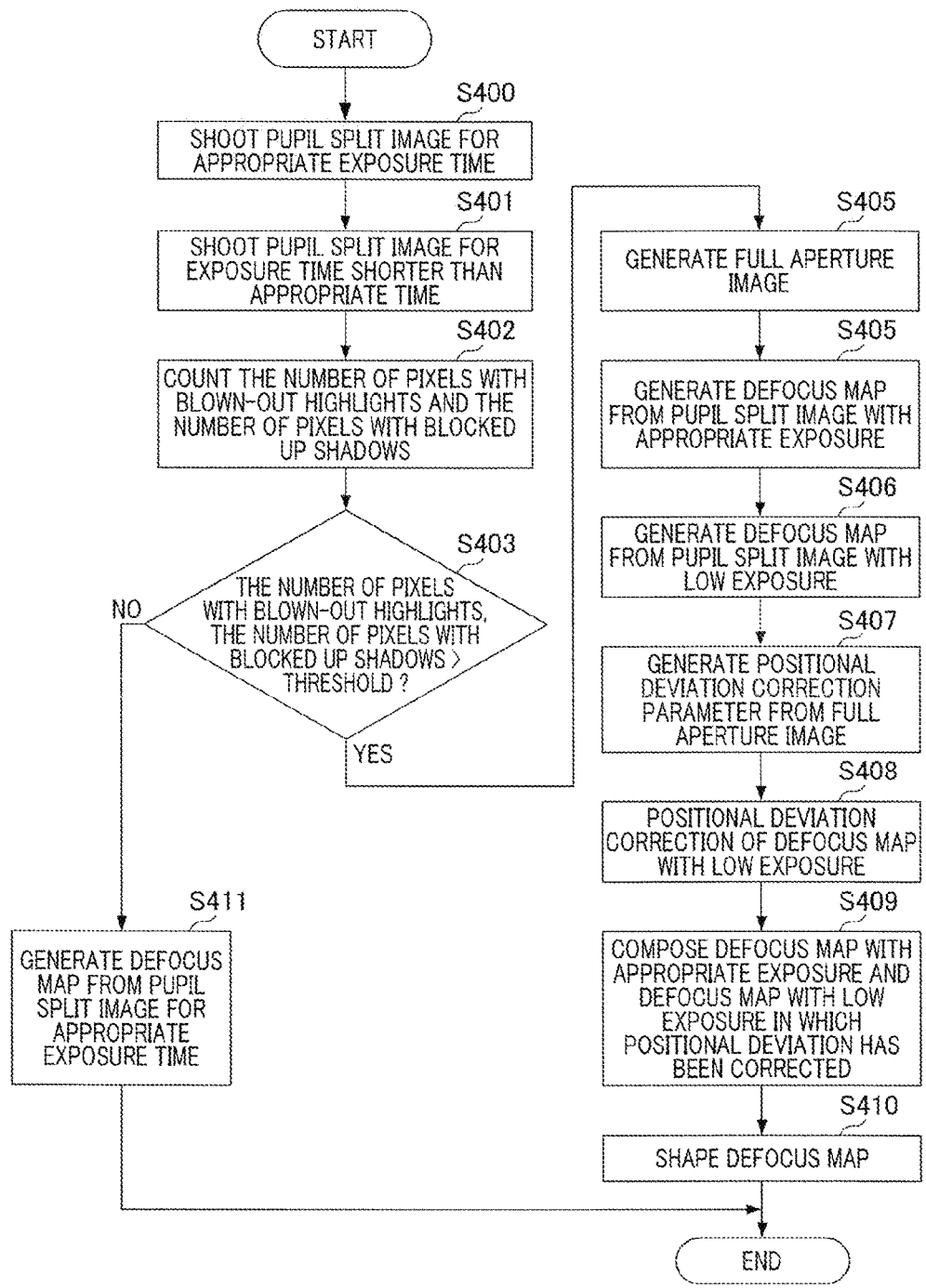

[Fig. 5]
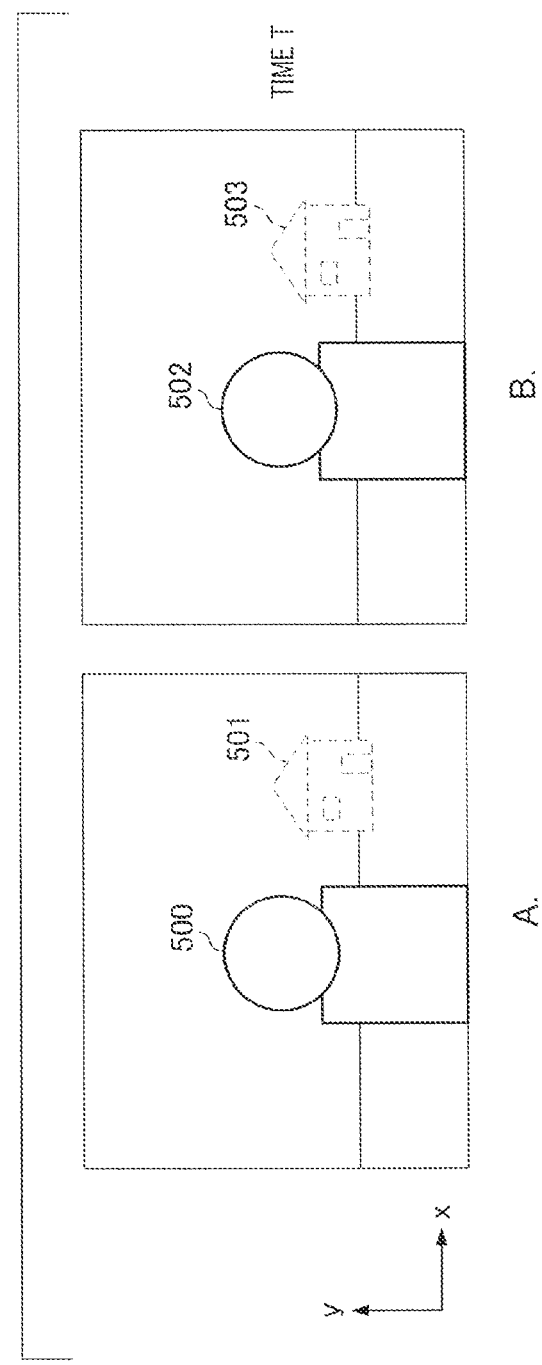

[Fig. 6]
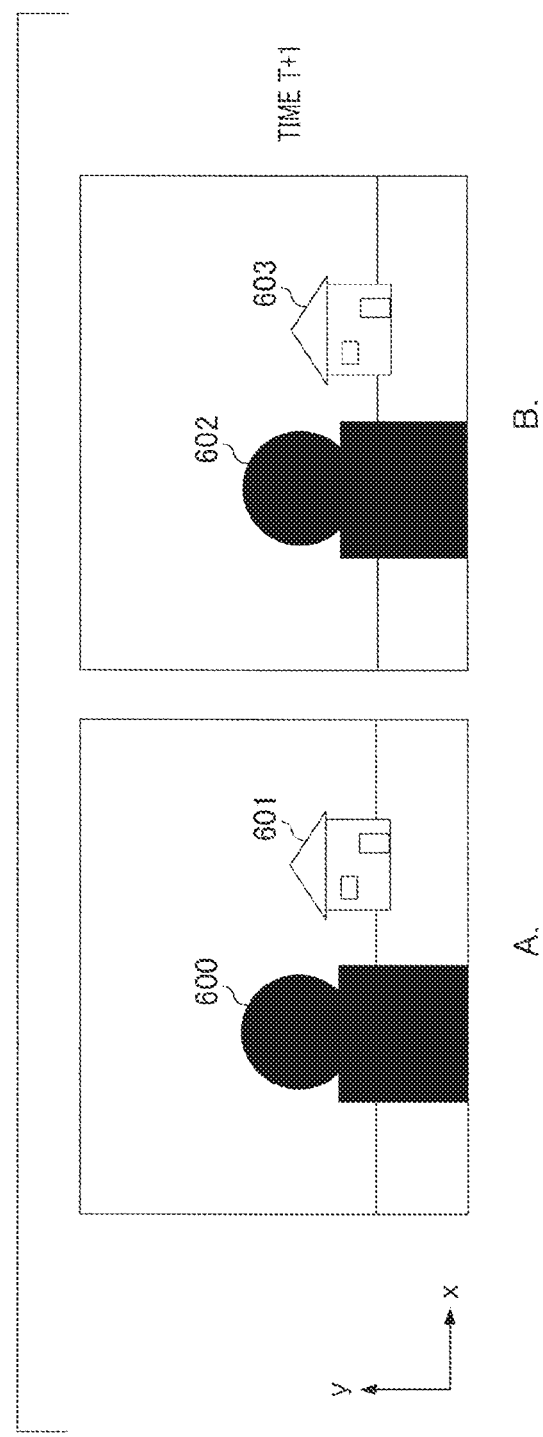

[Fig. 7]
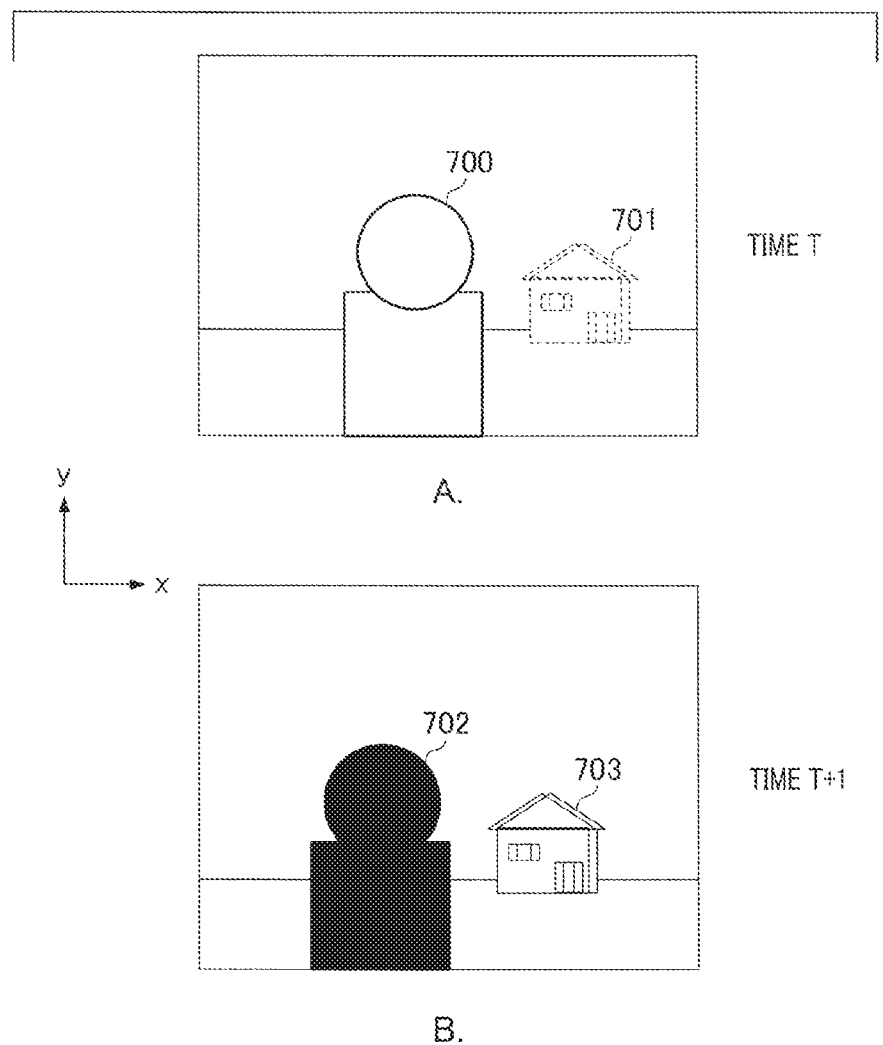

[Fig. 8]
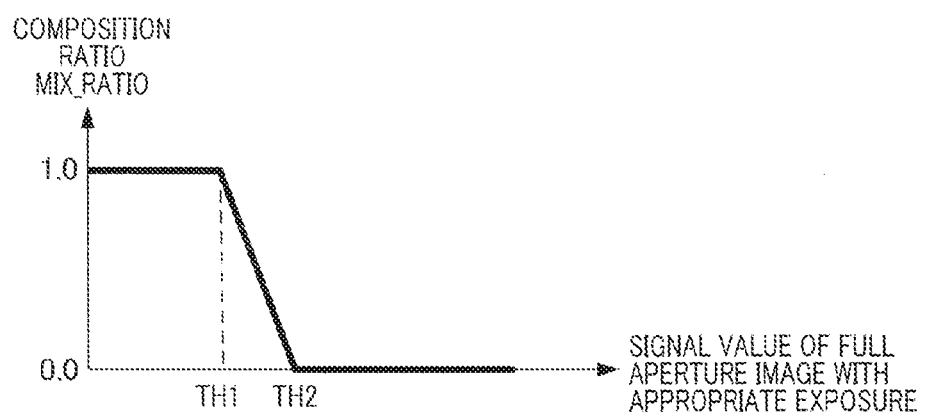

[Fig. 9]
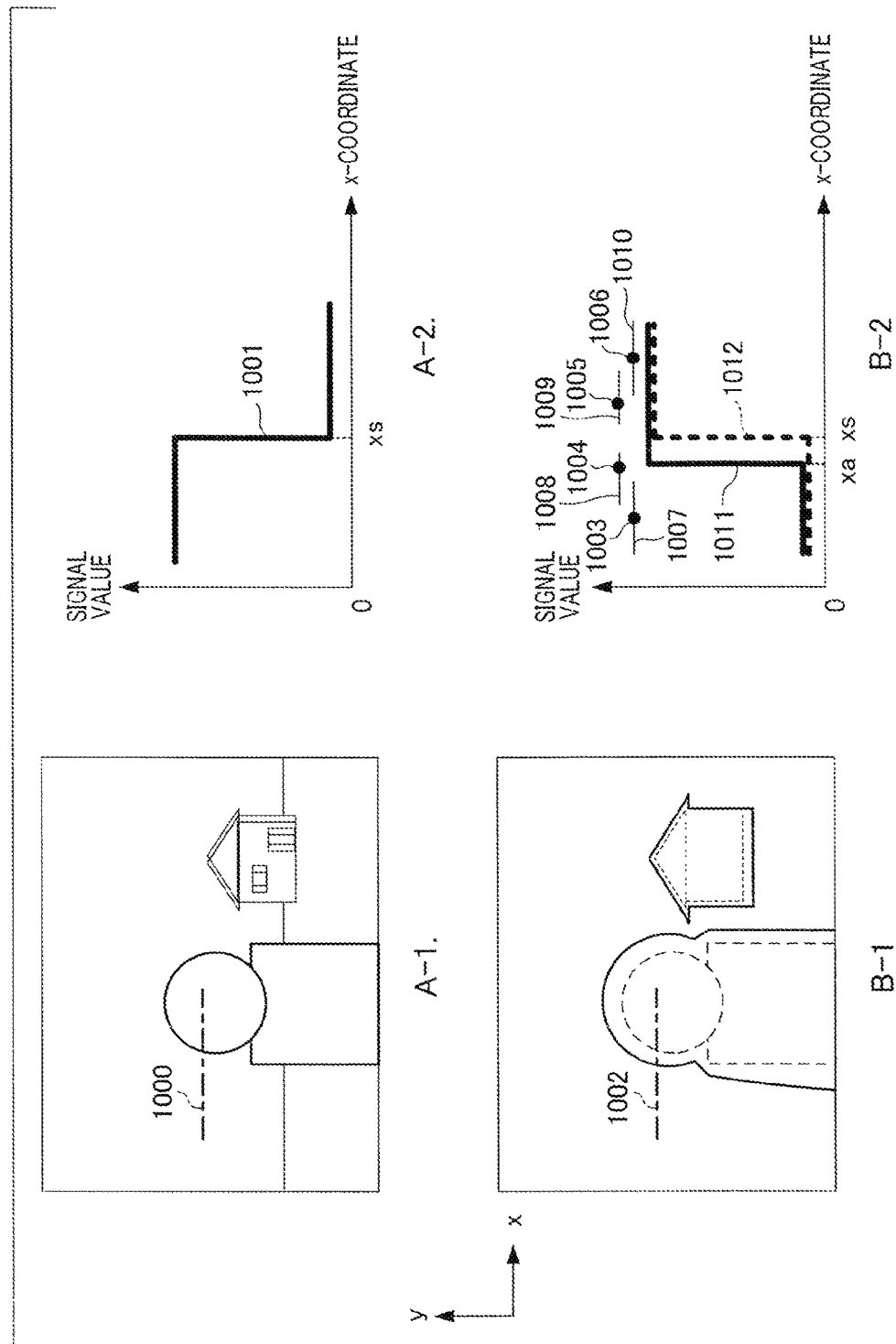

[Fig. 10A]
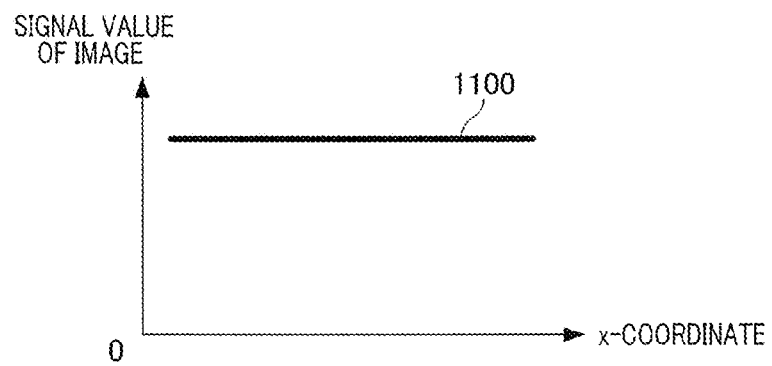
[Fig. 10B]
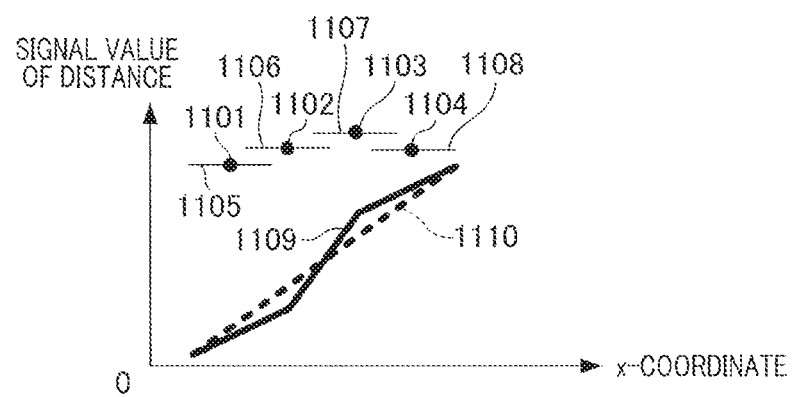

[Fig. 11]
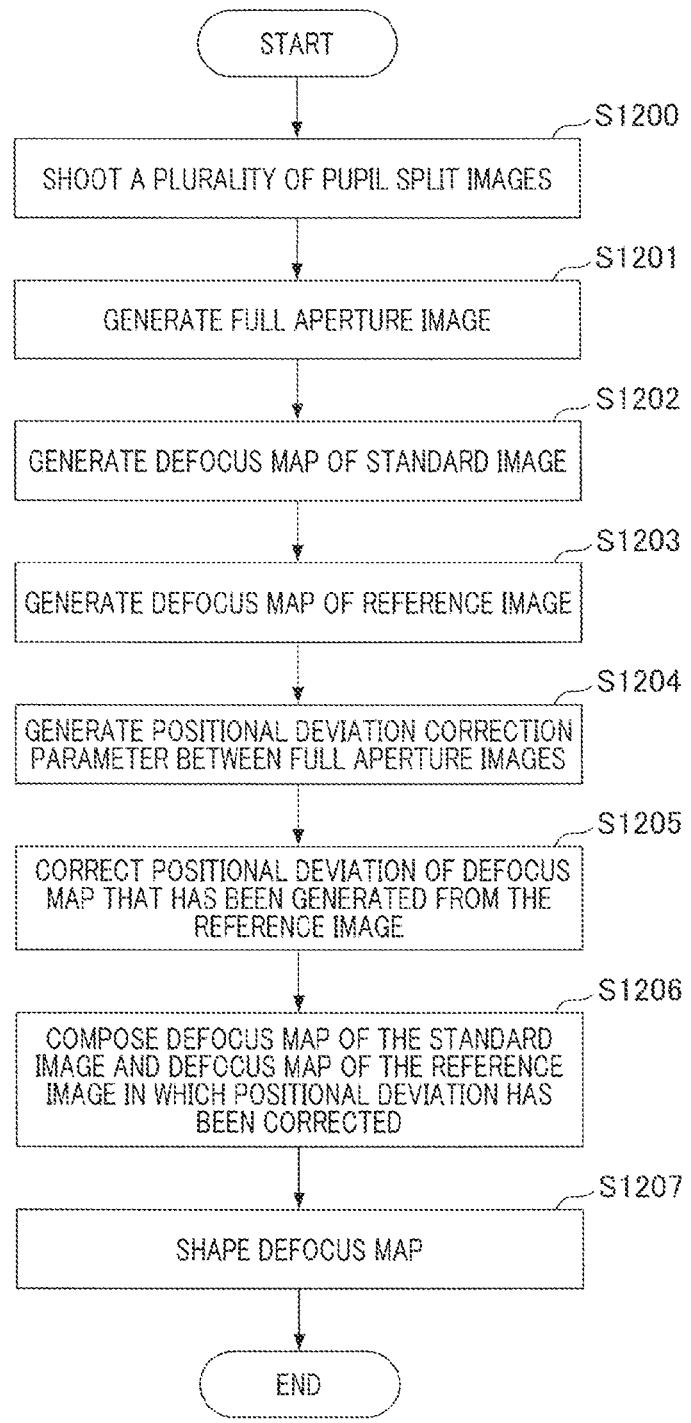

IMAGE PROCESSING APPARATUS, IMAGE PICKUP APPARATUS, IMAGE PROCESSING METHOD, AND STORAGE MEDIUM

TECHNICAL FIELD

The present invention relates to an image processing technique that acquires information related to defocus distribution by using a plurality of images that have different shooting times.

BACKGROUND ART

In fields such as computer vision, there is a technique that acquires a defocus map representing a spatial distribution of a defocus amount for a captured image. Patent Literature 1 discloses a technique that composes the defocus maps that are acquired from the data for three images that have different exposure times, in order to generate a more correct defocus map even if a luminance difference between the image signals in the angle of view is large.

CITATION LIST

Patent Literature

Patent Literature 1: Japanese Patent Application Laid-Open Publication No. 2012-182731

However, in the conventional technical art disclosed in Japanese Patent Application Laid-Open Publication No. 2012-182731, if camera shaking and the like has occurred in the three images that have different exposure times, the accuracy of the defocus map to be calculated may be reduced. Additionally, during high sensitivity image pickup, a noise amount included in image data increases, and thus, the accuracy of the defocus map to be calculated may be reduced.

SUMMARY OF INVENTION

The present invention is to provide an image processing apparatus that can generate data with a more correct defocus distribution by using a plurality of image data that have different shooting times.

The image processing apparatus according to an embodiment of the present invention comprises an acquiring unit configured to acquire first and second sets of image data that have different shooting times; a generating unit configured to generate first and second map data that respectively represent a spatial distribution of a defocus amount, by using the first and second sets of image data; an alignment unit configured to acquire the first and second map data that has been generated by the generating unit and perform alignment; and a composing unit configured to perform composing processing of the first and second map data in which alignment has been performed by the alignment unit.

Further features of the present invention will become apparent from the following description of exemplary embodiments with reference to the attached drawings.

BRIEF DESCRIPTION OF DRAWINGS

FIG. 1 is a block diagram illustrating a functional configuration example of a digital camera according to an embodiment of the present invention.

FIG. 2A is illustrates a configuration example of a pixel arrangement of an image pickup unit according to the embodiments of the present invention.

FIG. 2B is an explanatory diagram of the concept of pupil split.

FIG. 3 is a block diagram illustrating a functional configuration example of an image processing unit according to the embodiments of the present invention.

FIG. 4 is a flowchart illustrating the process of the image processing unit according to a first embodiment of the present invention.

FIG. 5 illustrates an image that has been taken with an appropriate exposure time in the first embodiment.

FIG. 6 illustrates an image that has been taken with an exposure time shorter than the appropriate exposure time.

FIG. 7 illustrates a full aperture image at time T and T+1.

FIG. 8 illustrates a composition ratio of a defocus map.

FIG. 9 illustrates the shaping processing of the defocus map.

FIG. 10A illustrates a signal value profile in a cross-sectional view of a shaping image.

FIG. 10B illustrates an effect by the shaping processing of the defocus map.

FIG. 11 is a flowchart illustrating the process of the image processing unit according to a second embodiment of the present invention.

DESCRIPTION OF EMBODIMENTS

Hereinafter, a description will be given of preferred embodiments of the present invention with reference to the accompanying drawings. Note that a description will be given of an example that is applied to a digital camera as an image processing apparatus according to the embodiments described below.

First Embodiment

In an image pickup apparatus according to a first embodiment of the present invention, a description will be given of an image processing apparatus that can generate a more correct defocus map even if a luminance difference between image signals in the angle of view is large.

FIG. 1 is a block diagram illustrating a functional configuration of a digital camera 100 according to the present embodiment. A system control unit 101 includes, for example, a CPU (central processing unit). The system control unit 101 reads out a program that controls the operation and process of each component unit included in the digital camera 100 from a ROM (Read Only Memory) 102, deploys it in a RAM (random access memory) 103, and executes it. The ROM 102 is a nonvolatile memory that enables rewriting data, and stores a parameter required for the operation of each component unit, other than the program that controls the operation and process of the digital camera 100. For example, data including an exit pupil distance used as lens information necessary for focus detection is stored in the ROM 102. The RAM 103 is a volatile memory that enables rewriting data, and is used as a temporary storage region for data that has been output in the process of the digital camera 100.

An image pickup optical system 104 forms light from an object on an image pickup unit 105. The image pickup optical system 104 includes a lens and a diaphragm, and the diaphragm performs light amount adjustment during image pickup by adjusting the aperture diameter of the image pickup optical system 104. The image pickup unit 105 includes image pickup elements, for example, a CCD (charge coupling element) sensor and a CMOS (complementary metal oxide semiconductor) sensor. The image pickup unit 105 photoelectrically converts an optical image that has been formed by the image pickup optical system 104, and outputs an analog image signal that has been acquired to an A (analog)/D (digital) converting unit 106. The A/D converting unit 106 performs A/D conversion processing to the analog image signals that have been input, and outputs the digital image data to the RAM 103 to store it therein.

An image processing unit 107 performs processing including white balance adjustment, color interpolation, reduction/enlargement, filtering, and the like on the image data stored in the RAM 103. The image processing unit 107 further performs a variety of image processing such as generation of a defocus map, alignment of a plurality of images, composing processing, and the like. A recording medium 108 is an attachable and detachable memory card and the like, and data of images that has been processed by the image processing unit 107 stored in the RAM 103 and data of images that has been A/D-converted by the A/D converting unit 106, and the like are recorded as recording image data. A bus 109 is used for transmission and reception of signals between the each component unit.

FIG. 2A is a schematic diagram illustrating a configuration example of pixel arrangement of the image pickup unit 105 in FIG. 1. In FIG. 2A, a direction orthogonal to the drawing is defined as the z direction, and a front side is defined as the +z direction. A first direction orthogonal to the z direction is defined as the x direction, and a right direction in FIG. 2A is defined as the +x direction. Additionally, a second direction orthogonal to the z direction is defined as the y direction and the upper direction in FIG. 2A is defined as the +y direction. FIG. 2A illustrates a schematic diagram that enlarges a pixel 200. The pixel 200 is configured of a micro lens 201, a pair of photoelectric conversion units 202A and 203B (hereinafter, referred to as pupil split pixels 202A and 203B). In the image pickup unit 105, a plurality of pixels 200 is regularly arranged in a two-dimensional array state. In the present embodiment, an A image and a B image are respectively output as a pair of images from the pupil split pixels 202A and 203B that are regularly arranged. In the following description, the A image and the B image, which are a pair of images, are referred to as a "pupil split image".

FIG. 2B is a schematically explanatory diagram of the pupil split. At the lower side of FIG. 2B, a cross-sectional view when a cross-section along the line S-S of the pixel 200 shown in FIG. 2A is viewed from the +y direction is shown, and at the upper side, an exit pupil plane of the image pickup optical system 104 when viewed from the −z direction is shown in the x-y plane. In FIG. 2B, in order to correspond with the coordinate axis of the exit pupil plane, the x-direction in the cross-sectional view is shown in an inverted manner with respect to FIG. 2A.

The image pickup unit 105 is disposed near the imaging plane of the image pickup optical system 104, and light flux from the object passes through the exit pupil 800 of the image pickup optical system 104 and enters the pixels corresponding each other. The size of the exit pupil 800 changes depending on the size of diaphragm or the size of a lens frame that holds the lens. Pupil partial regions 801A and 802B are in a substantially conjugate relation due to the light receiving surfaces of the pupil split pixels 202A and 203B that are divided in two in the x direction, and the microlens. Accordingly, the light flux that has passed through each pupil partial region is received by each pupil split pixel having a neighboring relation. If the number of pupil split in the horizontal direction is denoted as "M" and the number of pupil split in the vertical direction is denoted as "N", the exit pupil 800 of the image pickup optical system 104 is divided into different pupil partial regions, serving the number of the pupil split as Np=M×N. If the diaphragm value of the image pickup optical system 104 is denoted as "F", the effective diaphragm value of the pupil partial region is generally represented by ($\sqrt{(M \times N)}$) the ×F. Additionally, the pupil region 803 is a pupil region that is receivable in the entire pixel 200 (full aperture region) when the photoelectric conversion units that are divided into M×N are all combined. For example, if the number of pupil split is denoted as "M=2, N=1", the effective diaphragm value of the pupil partial region is $\sqrt{2}$ times F. That is, one pupil split image is deep in the depth of field for one stage as compared with the full aperture image, and a dark image can be acquired. According to the above configuration, a pair of light fluxes each passing through the different regions in a pupil of the image pickup optical system 104 in FIG. 1 is formed as a pair of optical images, and they can be output as the A image and the B image, which are a pair of images.

Next, a description will be given of a configuration and process of the image processing unit 107 in FIG. 1. FIG. 3 is a block diagram illustrating an example of a specific configuration of the image processing unit 107. The image processing unit 107 includes each processing unit shown by the reference numerals 300 to 306 (details of each processing unit will be described below). Additionally, FIG. 4 is a flowchart illustrating a process performed by the image processing unit 107. Hereinafter, a description will be given along the flowchart in FIG. 4.

First, in S400, the image pickup unit 105 acquires the pupil split image, which is a pair of images for an appropriate exposure time, by the image capturing operation. An example of a first set of images acquired in S400 is shown in FIG. 5. In the drawing of FIG. 5, the right and left direction is defined as the x direction, and the right direction is defined as the +x direction. Additionally, in the drawing of FIG. 5, the vertical direction orthogonal to the x direction is defined as the y direction, and the upward direction is defined as the +y direction. Figures A and B in FIG. 5 each shows an image that has been captured at time T, and shows a scene in which a person against the sun is present and a luminance difference between the person and the background is large. A photometry sensor mounted on the camera measures each luminance of the persons 500 and 502, and the system control unit 101 controls the exposure time so as to have an appropriate exposure to the person.

In FIG. 5, although buildings 501 and 503 are photographed respectively, pixels that are referred to as "blown-out highlights" are present because the exposure time was controlled so as to have an appropriate brightness for the person, and as a result, the edge is unclear. The "blown-out highlights" refers to a state in which an image region that originally has the intensity of brightness turns out to be white. In generating defocus map data to be described below, if the region with blown-out highlights is present, a correct defocus amount cannot be calculated. The image shown in FIG. 5 (A) is an image that has been output from the pupil split pixel 202A of the pixels that have been acquired by dividing the pupil into two in the horizontal direction, which is an image that has been captured by focusing on the person 500. The image shown in FIG. 5 (B) is an image that has been output from the pupil split pixel 203B, which is the other one of the pixels that has been acquired by dividing the pupil into two in the horizontal direction. The position of the person 502 is the same as that of the person 500 in FIG. 5 (A). In contrast, because the building 503 serving as the background has a parallax in the horizontal direction, as compared with the image of the building 501 in FIG. 5 (A), it deviates in the direction of −x axis. In the following description, a pupil split image shot for an appropriate exposure time is referred to as an "appropriate exposure image". Note that the pupil split image, which is a pair of images, can be acquired at the same time. Additionally, it may be possible to record the pupil split image that has been captured in advance with an appropriate exposure on the recording medium 108 and read out the image. In the present embodiment, although the pupil is split into two in the horizontal direction, the present invention is not limited thereto, and it may be possible to a perform pupil split in any direction and any number of split.

Next, in S401 of FIG. 4, the image pickup unit 105 acquires a pupil split image by the image capturing operation for an exposure time that is shorter than the appropriate exposure time. Examples of a second set of images acquired in S401 are shown in FIG. 6. In the drawings of FIG. 6, the right and left direction is defined as the x direction, and the right direction is defined as the +x direction. Additionally, in the drawings of FIG. 6, the vertical direction orthogonal to the x direction is defined as the y direction, and the upward direction is defined as the +y direction. FIG. 6 (A) shows an output image of the pupil split pixel 202A that has been captured at time T+1. In the image shown in FIG. 6 (A), because the exposure time is shorter than the exposure time set in S400, what is referred to as "blocked up shadows" occurs on the image of person, and as a result, the edge is unclear. The "blocked up shadows" refers to a state in which the dark image region turns out to be black. In the region with blocked up shadows, it is impossible to calculate a correct defocus amount in the generation processing of the defocus map data. In contrast, blown-out highlights do not occur on the image of the building serving as the background, and the edge is clear. Additionally, in the image shown in FIG. 6 (A), a person 600 is focused on, and as compared with FIG. 5 (A), the layout deviates in the −x direction and the −y direction due to the influence of camera shaking.

FIG. 6B shows an output image of the pupil split pixel 203B that has been captured at time T+1. As compared with FIG. 6 (A), because the building 603 has parallax, deviation occurs, and additionally, as compared with FIG. 5 (B), the layout deviates in the −x direction and the −y direction due to the influence of camera shaking by a photographer. In the following description, a pupil split image that has been shot for an exposure time shorter than the appropriate exposure time is referred to as a "low exposure image". In S400 and S401, the process that acquires a plurality of a pair of images that have different exposure times at different times is executed. That is, although the first set of image data and the second set of the image data differ in shooting time and the exposure time, there is no limit in the number of shots if the data has two or more sets.

In S402 of FIG. 4, the pixel count unit 300 counts the number of pixels with blown-out highlights and that of pixels with blocked up shadows, for the pupil split images that have been captured in each of S400 and S401. The number of pixels with blown-out highlights is the number of pixels having a pixel value larger than a first threshold value, and the number of pixels with blocked up shadows is the number of pixels having a pixel value smaller than a second threshold value. With respect to the appropriate exposure image and the low exposure image, the number of pixels with blown-out highlights and that of pixels with blocked up shadows are measured, and each count number is output.

In step S403, the image processing unit 107 compares the count number acquired in S402 with the threshold value that has been set in advance. If the number of pixels with blown-out highlights or the number pixels with blocked up shadows is larger than the threshold that has been set in advance, the process proceeds to S404, and if the number of pixels with blown-out highlights and the number of pixels with blocked up shadows are less than the threshold value, the process proceeds to S411.

In S404, an addition image generating unit 301 adds a signal of the pupil split image that has been acquired by shooting in S400 and S401, by using the following formula:

$$G(x,y)=A(x,y)+B(x,y) \quad (1)$$

In the formula (1), G (x, y) represents a signal (full aperture signal) that digitally reconstructs an optical image by the light flux that has passed through the entire region of the pupil of the image pickup optical system 104. Additionally, A (x, y) represents the output signal of the pupil split pixel 202A (A image signal), and B (x, y) represents the output signal of the pupil split pixel 203B (B image signal). Hereinafter, an image consisting of full aperture signal G (x, y) is referred to as a "full aperture image".

FIG. 7 shows image examples. FIG. 7 (A) shows an image at time T, acquired by adding images of A. and B. in FIG. 5. FIG. 7 (B) shows an image at time T+1, acquired by adding the images of A. and B. in FIG. 6. The right and left direction in the drawing of FIG. 7 is defined as the x direction, and the right direction is defined as the +x direction. Additionally, in the drawing of FIG. 7, the vertical direction orthogonal to the x direction is defined as the y direction and the upward direction is defined as the +y direction.

In the image example shown in FIG. 7 (A), because the image of a person 700 is an object image in a focused state, there is no parallax, and even if the image is added, blur does not occur. Additionally, because the image is taken with appropriate brightness, the edge of the object image is clear. In contrast, because the image of the building 701 that is the background is generated by composing the images with a parallax, blur occurs. Additionally, the edge of the background image is unclear due to the influence of blown-out highlights.

In the image example shown in FIG. 7 (B), because the image of a person 702 is an object image in a focused state, there is no parallax, and even if the image is added, blur does not occur. However, the edge of the object image is unclear due to the influence of blocked up shadows. In contrast, because the image of the building 703 that is the background is generated by composing the images with parallax, blown-out highlights do not occur while blur occurs.

Note that, in the present embodiment, although an example of generating a full aperture image, in which a pair of pupil split images serves as an input image, was described, the present invention is not limited thereto. For example, it may be possible for a full aperture image and one pupil split image (A image or B image) to serve as the input image, subtract the signal of the one pupil split image from the signal of the full aperture image, and consequently generate the signal of the other pupil split image.

In S405 of FIG. 4A, a defocus map generating unit (hereinafter, simply referred to as a "map generating unit") 302 calculates a defocus amount for each target pixel position by using each signal of the A image and the B image, which are pupil split images acquired by shot in S400. The defocus amount is information related to the distance distribution of the object, and represents the value of the defocus map data. The process that calculates the defocus amount from the A image and the B images is as follows.

The signal sequence of the A image at the target pixel position is denoted as E(1) through E(m), and that of the B image is denoted as F(1) through F(m). While shifting the signal sequence F(1) through F(m) of the B image relative to the signal sequence E(1) through E(m) of the A image, the calculation of a correlation amount C(k) in a shift amount k between the two signal sequences is performed by using the following formula (2):

$$C(k)=\Sigma|E(n)-F(n+k)| \qquad (2)$$

In the formula (2), the $\Sigma$ calculation denotes a calculation that calculates the total sum for n. In the $\Sigma$ calculation, the range that n and n+k take is limited to the range from 1 to m. The shift amount k takes an integer value, and represents a relative shift amount, serving a detection pitch of a pair of data as a unit.

Of the calculation results for the formula (2), the correlation amount C(k) is minimized in a shift amount (shift amount k) in which the correlation of a pair of signal sequences is high. In the following, when a discrete correlation amount C(k) is minimized, "k" is represented as "kj". By using the three-point interpolation processing according to the following formulas (3) through (5), the shift amount x that provides the minimum value C(x) with respect to the continuous correlation amount is calculated.

$$x=kj+D/\text{SLOP} \qquad (3)$$

$$D=\{C(kj-1)C(kj+1)\}/2 \qquad (4)$$

$$\text{SLOP}=\text{MAX}\{C(kj+1)-C(kj),C(kj-1)-C(kj)\} \qquad (5)$$

The defocus amount (referred to as "DEF") can be determined by the following formula (6) based on the shift amount x calculated in the formula (3):

$$\text{DEF}=KX \cdot PY \cdot x \qquad (6)$$

KX represented in the formula (6) is a conversion coefficient determined by the size of the opening angle of the center of gravity of the light flux passing through a pair of pupil regions.

PY is a detection pitch. If the reference region is a region with blown-out highlights or a region with blocked up shadows, the item of |E (n)–F (n+k)| in the formula (2) becomes zero, and the value of C(k) becomes zero. Accordingly, kj in which the correlation amount C(k) is minimized cannot be calculated correctly, and as a result, the defocus amount that has been calculated is no longer a correct value.

The map generating unit 302 outputs defocus map data representing a spatial distribution of the defocus amount that has been calculated (distribution on a two-dimensional plane of the captured image). For the following description, the defocus map that has been generated by the map generating unit 302 in S405 of FIG. 4 is referred to as an "appropriate exposure defocus map".

In S406, the map generating unit 302 generates a defocus map from the pupil split images acquired by a shot in S401. Because the generating processing of the defocus map is the same as the case of S405, a detailed description thereof will be omitted. For the following description, the defocus map that has been generated by the map generating unit 302 in S406 is referred to as a "low exposure defocus map".

In S407, a positional deviation correction control parameter calculation unit (hereinafter, simply referred to as a "parameter calculation unit") 303 calculates a control parameter used for the geometric deformation processing by a positional deviation correction unit 304. In order to perform the alignment processing in cooperation with the positional deviation correction unit 304, the parameter calculation unit 303 uses the full aperture image generated in S404 to calculate the control parameter for the positional deviation correction. The calculating method of the control parameter will be described below.

The parameter calculation unit 303 first sets the full aperture image with an appropriate exposure (see FIG. 7 (A)) as a standard image. Subsequently, the parameter calculation unit 303 calculates a motion vector serving as a parameter that represents a positional deviation amount of the full aperture image with low exposure (see FIG. 7 (B)) with respect to the standard image. There is a known template matching processing and the like that serve as a calculating method of the motion vector. For example, if a photographer takes image with a camera in his/her hand, the motion vector calculated here corresponds to the amount of camera shaking. Next, the parameter calculation unit 303 calculates a projection conversion coefficient based on the motion vector that has been calculated. Known techniques are used for the conversion method from the motion vector to the projection conversion coefficient. The projection conversion coefficient that has been calculated in this manner is a control parameter for correcting positional deviation. It should be noted that similar to the case of the calculation of the defocus amount, in the region with blown-out highlights and the region with blocked up shadows, a correct value regarding the motion vector cannot be calculated. In the region with blown-out highlights or the region with blocked up shadows, a process that calculates the projection conversion coefficient is performed by referring to the motion vector with a high accuracy that has been calculated at the peripheral region.

In the present embodiment, although an example in which the projection conversion coefficient is calculated from the motion vector was described, the present invention is not limited thereto. For example, the projection conversion coefficient may be calculated by acquiring detection information of an acceleration sensor and an angular velocity sensor mounted on the camera. Alternatively, before the calculation of the motion vector, the image processing unit may perform a process that combines the brightness of the full aperture image with an appropriate exposure and that of the full aperture image with low exposure.

Additionally, regarding the image used to calculate the motion vector, it is also possible to enhance the calculation accuracy of the motion vector by referring not only the full aperture image but also the pupil split image. Specifically, the parameter calculation unit 303 refers to the full aperture image when calculating the motion vector in a focal region that is in focus, that is, in a near-field region of an object that is in focus during a shot. Additionally, regarding a region not in focus, in other words, regarding the background region where blur occurs, the parameter calculation unit 303 calculates the motion vector by referring to the pupil split image. Because the pupil split image is deeper in focus depth than the full aperture image, blur occurs with difficulty even in the background, and the edge of the object is clear. Therefore, it is possible to improve the accuracy of the template matching processing.

In S408 of FIG. 4, the positional deviation correction unit 304 performs the geometric deformation processing on the low exposure defocus map generated in S406 by using the projection conversion coefficient calculated in S407. Alignment is performed by this geometric deformation processing. In the low exposure defocus map after the geometric deformation processing, the positional deviation from the appropriate exposure defocus map generated in S405 is eliminated, or the positional deviation amount is reduced within an allowable range. In the present embodiment, in the deformation processing of an image with alignment, the deformation processing is performed on the defocus map. It is assumed that alignment deformation is performed on the pupil split image that is referred to during the generation of the defocus map, and it is input to the map generation unit 302. However, if a component in the roll direction is contained in a component of the camera shaking, the direction having a parallax due to the deformation of alignment changes from the pupil split direction (in the present embodiment, the horizontal direction). Hence, there is a probability that the result for the correlation calculation shown in the formula (2) diverges in accordance with the presence or absence of deformation. In particular, because the influence increases if the object image has a diagonal line, a defocus map to be calculated is no longer correct.

In the present embodiment, the appropriate exposure image acquired from the first set of image data serves as a standard image, and the positional deviation correction unit 304 performs the geometric deformation processing of the low exposure defocus map. This is not limiting, and it is possible that the low exposure image acquired from the first set of image data may serve as a standard image, and the geometrical deformation processing of the appropriate exposure defocus map is performed.

In S409, a composition processing unit 305 composes the appropriate exposure defocus map generated in S405 and the low exposure defocus map after the geometric deformation processing by which positional deviation has been corrected in S408, and generates a composed defocus map. The composition processing unit 305 refers to the full aperture image with the appropriate exposure, and extracts the region with blown-out highlights from the signal value of the full aperture image with the appropriate exposure. Subsequently, the composition processing unit 305 performs the processing that replaces the signal value of the distance of the blown-out highlights region in the appropriate exposure defocus map by the signal values of the distance of the corresponding region in the low exposure defocus map where blown-out highlights do not occur. The replacement processing is performed by composition of the signal value of distance. That is, the signal value of the distance after composition is denoted as DEF_MIX, and the signal value of the distance with an appropriate exposure is denoted as DEF_OVER, and the signal value of the distance with low exposure is denoted as DEF_UNDER. DEF_MIX is calculated by the following formula:

DEF_MIX=DEF_OVER·MIX_RATIO+DEF_UNDER·(1.0−MIX_RATIO)   (7)

MIX_RATIO in the formula (7) is a composite ratio. FIG. 8 illustrates MIX_RATIO using a graph. In FIG. 8, the horizontal axis represents the signal value of the full aperture image with the appropriate exposure, and the vertical axis represents the composition ratio, MIX_RATIO. A threshold TH2 is the value when the signal value of the full aperture image with the appropriate exposure is blown-out highlights. If the signal value is less than TH2, "1.0≥MIX_RATIO>0.0" is acquired. In contrast, in the section of Th2 or more, "MIX_RATIO=0.0" is acquired.

Additionally, the composition ratio in which linear interpolation is performed in the section from the value shown by Th1 (<TH2) to the threshold Th2 is acquired so that the composition ratio changes smoothly in the composition boundary region. In other words, in the section from TH1 to TH2, as the signal value increases, the composition ratio reduces in accordance with the primary function formula. By composing the defocus map in this way, the points where the correct defocus amount cannot be calculated due to the occurrence of blown-out highlights or blocked up shadows are replaced with the correct defocus amount. Accordingly, a correct defocus map can be generated.

The above composition processing is executed for all of the pixels, and a defocus map after composition is generated. Note that, in the present embodiment, a description was given of an example referring to the signal value of the full aperture image with the appropriate exposure when determining the composition ratio. The present invention is not limited thereto, and may refer to the size of the motion vector, which is a parameter used for alignment and the signal value of the defocus map. More specifically, when referring to the motion vector, the smaller the composition processing unit 305 sets the composition ratio, the larger the motion vector is. For example, because the larger the amount of camera shaking is, the larger the amount of deformation due to the positioning correction is, there is a high probability of causing inconsistencies in the boundary region of composition, and there is a concern that switching is more conspicuous. Accordingly, if acquiring a defocus map in which distance changes smoothly is emphasized, the processing that calculates the composition ratio from the motion vector amount and composes the defocus map is performed. Additionally, when referring to the signal value of the defocus map, the composition processing unit 305 calculates a difference value between the appropriate exposure defocus map and the low exposure defocus map, refers to the difference value, and calculates the composition ratio. For example, if the difference value is large, there is a probability that, during continuous shot, a large change has been caused in the object, for example, a moving body has entered the angle of view. Accordingly, the larger a difference value between the defocus maps is, the smaller the composition processing unit 305 sets the composition ratio.

In S410 of FIG. 4, the defocus map shaping unit (hereinafter, simply referred to as a "map shaping unit") 306 performs the shaping processing on the composed defocus map that has been generated in S409. The map shaping unit 306 performs bilateral filtering processing on the defocus map while referring to the shaping images. In the bilateral filtering processing, when the filtering result for the target pixel position p is referred to as "Jp", this is represented by the following formula (8):

$$Jp = (1/Kp)\Sigma\Pi q \cdot f(|p-q|) \cdot g(|I2p-I2q|) \qquad (8)$$

The meaning of each symbol in the formula (8) is as follows:

q: the peripheral pixel position

Ω: the integration target region centering the target pixel position p

Σ: integration of any q in range Q

I1q: defocus map signal value in the peripheral pixel position q f(|p−q|): Gaussian function centering the target pixel position p I2p: shaping image signal value at the target pixel position p I2q: shaping image signal value at the peripheral pixel position q g (|I2p−I2q|): Gaussian function centering the shaping image signal value I2p Kp: a normalization factor, integrated value of f·g weight.

If the difference between the signal value I2p at the target pixel position p and the signal value I2q at the peripheral pixel position q is small, in other words, if the pixel value of the target pixel and that of the peripheral pixel in the shaping images are close, the f·g weight of the peripheral pixel (weight of smoothing) increases. In the present embodiment, as shaping images, positional deviation correction in S408 is performed on the full aperture image with low exposure, and the composition processing with the full aperture image with the appropriate exposure is performed using the full aperture image that has been performed in the processing similar to S409 is used.

FIG. 9 is a diagram for explaining the process of the map shaping unit 306. FIG. 9 (A-1) illustrates a shaping image, which is an image acquired by composing the full aperture image with the appropriate exposure and the full aperture image with the low exposure, and an image on which pixels with blown-out highlights or blocked up shadows do not exist. In FIG. 9 (A-1) and FIG. 9 (B-1), the right-left direction in the drawing is defined as the x direction and the right direction is defined as the +x-direction. Additionally, the vertical direction orthogonal to the x direction in the drawing is defined as the y direction, and the upward direction is defined as +y direction. FIG. 9 (A-2) represents a signal value profile 1001 in the cross section at the position shown by dashed-dotted lines 1000 in FIG. 9 (A-1). The horizontal axis represents the x-coordinate, and the vertical axis represents the signal value. The shape of the signal value profile 1001 is a stepped shape that significantly changes (lowers) at the position of xs in the increasing direction of the x-coordinate. Because the position of xs corresponds to the outline of the person in the shaping image, the signal value changes sharply.

FIG. 9 (B-1) illustrates a composed defocus map that has been generated in S409. Because the composition processing is performed on the defocus maps that are generated with the appropriate exposure and with low exposure respectively, a defocus map that has not been affected by blown-out highlights and blocked up shadows can be obtained. In FIG. 9 (B-1), a portion shown by dotted lines represents the outline of the shaping image shown in FIG. 9 (A-1). That is, due to the influence of the reference range of the correlation calculation, the outline of the defocus map extends outside of the outline of the shaping image, which is correct. In FIG. 9 (B-2), a signal value profile 1011 in the cross section at the position shown by dashed-dotted lines 1002 in FIG. 9 (B-1) (corresponding to the position shown by the dashed-dotted lines 1000 in FIG. 9 (A-1)) is represented by a solid line. The horizontal axis represents the x-coordinate, and the vertical axis represents the signal value of the distance. Regarding the signal value of the distance, the signal value of the background that is located far from the position of the camera is small, and the signal value of the person that is located near the camera is large.

The shape of the signal value profile 1011 shown by the solid line in FIG. 9 (B-2) has a stepped shape that significantly changes (increases) at the position where xa is smaller than xs in the increasing direction of the x-coordinate. Black dots 1003, 1004, 1005, and 1006 each show the target pixel position p in the formula (8). The region where the g value in the formula (8) is large, in other words, the range of smoothing is shown by line segments 1007, 1008, 1009, and 1010, respectively, are shown. In the signal value profile 1001 of the shaping image shown in FIG. 9 (A-2), the signal value changes sharply at the position xs that corresponds to the outline of the person. Hence, at the position of the black points 1004 and 1005 showing a target pixel position in the vicinity of the outline of the person, the range of smoothing is shown by the line segments 1008 and 1009 respectively, and thereby along with the outline of the person in the shaping image, which is correct. As a result, when plotting the values of the filtering result Jp shown in the formula (8), a graph line 1012 shown by dotted lines is acquired. The shape of the graph line 1012 has a stepped shape that significantly changes (increases) at xs position in the increasing direction of the x-coordinate. In other words, through the defocus map shaping processing, the outline of the person in the defocus map can fit the correct outline (the outline the person in the shaping image).

The shaping processing of the defocus map not only has an operation to fit the signal value of the distance to the correct outline as described above, but is also effective for correcting distortion of the defocus map that has caused by the geometrical deformation processing during the positional deviation correction. A specific description will be given with reference to FIG. 10A and FIG. 10B. FIG. 10A represents a signal value profile in a cross section of the shaping image, where the horizontal axis represents the x-coordinate and the vertical axis represents the signal value of the image. A graph line 1100 shown in FIG. 10A is constant regardless of the x-coordinate value, and indicates that an identical object is present. In FIG. 10B, a graph line 1109 shown by a solid line represents a signal value profile of the defocus map in the coordinates that are the same as FIG. 10A. The horizontal axis represents the x-coordinate, and the vertical axis represents the signal value of the distance. The signal value of the distance increases as the x-coordinate value increases. This indicates the distance change of the object in the depth direction, and indicates that the larger the x-coordinate is, the closer the object is. The black dots 1101, 1102, 1103, and 1104 represent the target pixel positions, and between the black points 1102 and 1103, it is assumed that there is a boundary in the composing processing performed in S409. According to the graph line 1109 shown by a solid line, although the distance should normally change smoothly in the identical object image, it is found that the boundary after the composing processing is not smoothly connected due to the deformation processing accompanying the positional deviation correction. Accordingly, in the present embodiment, as shown by line segments 1105, 1106, 1107, and 1108, the range of smoothing is set and the shaping processing of the formula (8) is performed. As a result, as shown in a graph line 1110 by dotted lines, it is found that the signal value of the distance in the identical object image is smoothed, and the boundary after the composing processing is smoothly connected.

The process in S411 of FIG. 4 is executed when the number of pixels with blown-out highlights and the number of pixels with blocked up shadows are determined to be equal to or less than the threshold in S403. The image processing unit 107 determines that the accuracy of the defocus map is never reduced due to the influence of blown-out highlights or blocked up shadows, generates a defocus map from the pupil split image for an appropriate exposure time, and finishes the process.

In the present embodiment, even if the luminance difference between the images in the angle of view is large and the blown-out highlights or blocked up shadows occur, a correct defocus map can be generated by using a plurality of pupil split images that have different shooting times and the exposure time. Additionally, according to the present embodiment, the positional deviation correction is performed on the defocus map, thereby enabling the generation of a defocus map with high accuracy that takes into consideration both of the positional deviation and the correlation calculation. Furthermore, performing the shaping processing on the defocus map after composing allows reducing the distortion of the defocus map that has been caused by the geometrical deformation processing due to the positional deviation correction, and as a result, a defocus map that smoothly changes along the outline of the object can be generated. According to the present embodiment, alignment is taken into account by using a plurality of images that have different shooting times, and even if the luminance difference between the image signals in the angle of view is large, a more correct defocus map can be generated.

In the present embodiment, the pupil split image is used as a pair of images in order to calculate a defocus amount. The present invention is not limited thereto, and it is also possible to apply a DFD (Depth from Defocus) method using a pair of image data that is different in a blur state. Even in that case, a change of the blur amount due to the alignment correction may lead to the reduction in the calculation accuracy of the defocus map. Accordingly, the geometric deformation processing is performed on the defocus map. Additionally, regarding the shaping image that is referred to when the defocus map is shaped, a focus image is used that is focused on the object among the plurality of sets of image. Note that although a defocus map was described in the present embodiment, the present invention may be applied to a distance map that has been converted into map data related to the distance distribution at the object side via the imaging optical system, by using known techniques. This is also the same in the embodiment which will be described below.

Second Embodiment

Next, a description will be given of a second embodiment of the present invention. In the present embodiment, a description will be given of an image processing apparatus that can generate a correct defocus map even if a noise amount is large in a high-sensitivity shot. Because a functional configuration of an image pickup apparatus and a configuration of an image processing unit according to the present embodiment are the same as those in the first embodiment, the detailed descriptions thereof will be omitted by using the same reference numerals that have already used, and the differences will be mainly described.

FIG. 11 is a flowchart that explains the process of the image processing unit 107 according to the present embodiment. Hereinafter, a description will be given following the flowchart of FIG. 11. In S1200, the image pickup apparatus performs a high-sensitivity shot, and acquires a plurality of consecutive pupil split images. The number of shots at this time may be at least two. Alternatively, it may be possible that data of a plurality of pupil split images that have been shot in advance is recorded on the recording medium 108 and the image is read out.

In S1201, similar to the process in S404 of FIG. 4, the process that generates a full aperture image by the addition processing of the pupil split image is executed. In S1202, the image processing unit 107 selects a pupil split image as a standard, and generates a defocus map similar to the process in S405. In the present embodiment, a pupil split image that has been captured first serves as a standard image. Additionally, in the following explanation, the defocus map that has been generated using the standard image is referred to as a "standard defocus map". In the case of high-sensitivity shot, the amount of noise is larger than that in the case of a low-sensitivity shot. Therefore, due to the influence of noise, variations occur in the defocus amount that has been calculated.

In S1203, from among the plurality of pupil split images that has been shot, the map generating unit 302 generates a defocus map by using a pupil split image other than the pupil split image serving as a standard in S1202. Hereinafter, a pupil split image other than the pupil division image serving as the standard are referred to as a "reference image". The defocus map generated using the reference image is referred to as a "reference defocus map".

In S1204, the parameter calculation unit 303 generates a control parameter for correcting the positional deviation between the full aperture image corresponding to the reference image and the full aperture images corresponding to each standard image. The generation processing of the control parameters is the same as the processing in S407 of FIG. 4. In S1205, the positional deviation correction unit 304 performs the geometric deformation processing on the reference defocus map that has been generated in S1203 by using the control parameter for the positional deviation correction that has been calculated in S1204. Because the geometric deformation processing on the reference defocus map is performed, the geometric deformation processing never affects the correlation calculation.

In S1206, the composition processing unit 305 composes the standard defocus map generated in S1202 and the reference defocus map that has undergone the geometrical deformation processing in S1205 by averaging, and generates a composed defocus map. Composing the defocus map by averaging calculation enables reducing variations due to noise, and enables acquiring a defocus map with high accuracy. In S1207, the map shaping unit 306 performs the shaping processing on the composed defocus map that has been generated in S1206, similar to S410 in FIG. 4.

According to the present embodiment, even if the amount of noise is large in a high-sensitivity shot, a correct defocus map can be generated by using a plurality of pupil split images that have different shooting times. Additionally, a defocus map with a high accuracy that takes into consideration both of the positional deviation and the correlation calculation can be generated by performing the alignment processing on the defocus maps. Further, it possible to reduce the distortion of the defocus map while fitting the signal value of the distance to the correct outline by performing the shaping processing to the defocus map after the composition processing.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-101937, filed May 19, 2015, which is hereby incorporated by reference wherein in its entirety.

The invention claimed is:

1. An image processing apparatus comprising:
at least one processor and at least one memory storing computer instructions, wherein the computer instructions, when executed, cause the at least one processor, to function as:
an acquiring unit configured to acquire first and second sets of image data;
a generating unit configured to generate first and second map data that respectively represent a distribution of data related to distance of the object, by using the first and second sets of image data;
an alignment unit configured to acquire the first and second map data that has been generated by the generating unit and perform alignment; and
a composing unit configured to perform composing processing of the first and second map data in which alignment has been performed by the alignment unit,
wherein the alignment unit performs alignment of the first and second map data by performing geometrical deformation processing by using a control parameter acquired from the first and second sets of image data.

2. The image processing apparatus according to claim 1, wherein the first and second sets of image data is image data that has a parallax or image data that has a different a blur state.

3. The image processing apparatus according to claim 1, wherein the first set of image data and the second set of image data are image data that have different exposure times.

4. The image processing apparatus according to claim 1, wherein said computer instructions, when executed, cause the at least one processor to further function as a shaping unit configured to perform shaping processing of map data that has been composed by the composing unit.

5. The image processing apparatus according to claim 4, wherein, with respect to a target pixel in the map data that has been composed by the composing unit, the shaping unit calculates the distribution of data that has undergone the shaping processing by smoothing output of the target data and its peripheral data.

6. The image processing apparatus according to claim 5, wherein the shaping unit increases weight of the smoothness of the output of the peripheral pixel if a pixel value of the target pixel in the image data acquired by composing the first and second sets of image data or in the first or second set of image data is close to a pixel value of the peripheral pixels of the target pixel.

7. The image processing apparatus according to claim 1, wherein the composing unit sets a composing ratio used for composing the first and second map data, based on a pixel value that has been calculated by addition based on the first or second set of image data.

8. The image processing apparatus according to claim 1, wherein the composing unit sets a composing ratio used for composing the first and second map data in accordance with a size of a parameter that is used for alignment by the alignment unit.

9. The image processing apparatus according to claim 1, wherein the composing unit sets a composing ratio used for composing the first and second map data by using a difference value between the first map data and the second map data.

10. The image processing apparatus according to claim 1, wherein the composing unit performs the processing that composes the first map data that has been generated based on the first set of image data by the generating unit, and the second map data that has been generated based on the second set of image data by the generating unit, and in which an alignment has been performed on the first map data by the alignment unit by averaging.

11. The image processing apparatus according to claim 1, wherein, in a region that is in focus in an image, the alignment unit calculates the control parameter by using image data to which the first or the second set of image data has been added, and in a region that is not in focus in the image, calculates the control parameter by using one image data in either the first or second set.

12. The image processing apparatus according to claim 1, wherein said at least one processor and at least one memory further function as a pixel counting unit configured to count a number of pixels having a pixel value larger than a first threshold or the number of pixels having a pixel value smaller than a second threshold, in the first or second set of image data,
wherein the composing unit performs the composing processing if a number of pixels that has been counted by the pixel counting unit is larger than a threshold.

13. The image processing apparatus according to claim 1, wherein the first and second sets of image data that have different shooting times.

14. The image processing apparatus according to claim 1, wherein the distribution related to distance of the object is a spatial distribution of a defocus amount.

15. An image pickup apparatus comprising:
an image processing apparatus; and
an imaging element configured to capture an object through an image pickup optical system,
wherein the image processing apparatus comprises:
at least one processor and at least one memory functioning as:
an acquiring unit configured to acquire first and second sets of image data;
a generating unit configured to generate first and second map data that each represents a distribution of data related to distance of the object by using the first and second sets of image data;

an alignment unit configured to acquire the first and second map data that has been generated by the generating unit and perform alignment;

a composing unit configured to perform composing processing of the first and second map data in which alignment has been performed by the alignment unit, wherein the imaging element has a plurality of photoelectric conversion units that receive lights that have passed through different pupil regions in the image pickup optical system and performs photoelectrical conversion, wherein the alignment unit performs alignment of the first and second map data by performing geometrical deformation processing by using a control parameter acquired from the first and second sets of image data.

16. An image processing method executed by an image processing apparatus that acquires and processes first and second sets of image data, the method comprising:

generating first and second map data that each represents a distribution of data related to distance of the object by using the first and second sets of image data;

performing an alignment by acquiring the first and second map data that has been generated in the generating; and performing composition processing of the first and second map data in which alignment has been performed in the performing alignment, wherein the performing the alignment that an alignment of the first and second map data by performing geometrical deformation processing by using a control parameter acquired from the first and second sets of image data.

17. A non-transitory computer-readable medium storing a program for causing a computer to execute an image processing method executed by an image processing apparatus that acquires and processes first and second sets of image data, the method comprising:

generating first and second map data that each represents a distribution of data related to distance of the object by using the first and second sets of image data;

performing an alignment by acquiring the first and second map data that has been generated in the generating; and performing composition processing of the first and second map data in which alignment has been performed in the performing alignment, wherein the performing the alignment that an alignment of the first and second map data by performing geometrical deformation processing by using a control parameter acquired from the first and second sets of image data.

18. An image processing apparatus comprising:

at least one processor and at least one memory storing computer instructions, wherein the computer instructions, when executed, cause the at least one processor to function as:

an acquiring unit configured to acquire first and second sets of image data;

a generating unit configured to generate first and second map data that respectively represent a distribution of data related to distance of the object, by using the first and second sets of image data;

an alignment unit configured to acquire the first and second map data that has been generated by the generating unit and perform alignment; and a composing unit configured to perform composing processing of the first and second map data in which alignment has been performed by the alignment unit, wherein said computer instructions, when executed, cause the at least one processor to further function as a shaping unit configured to perform shaping processing of map data that has been composed by the composing unit, wherein, with respect to a target pixel in the map data that has been composed by the composing unit, the shaping unit calculates the distribution of data that has undergone the shaping processing by smoothing output of the target data and its peripheral data.

* * * * *